US011861317B1

(12) United States Patent
Ramanarayanan et al.

(10) Patent No.: US 11,861,317 B1
(45) Date of Patent: Jan. 2, 2024

(54) ENSEMBLE-BASED MACHINE LEARNING CHARACTERIZATION OF HUMAN-MACHINE DIALOG (71) Applicant: Educational Testing Service, Princeton, NJ (US)

(72) Inventors: Vikram Ramanarayanan, San Francisco, CA (US); Matthew Mulholland, Ewing, NJ (US); Debanjan Ghosh, Cambridge, MA (US)

(73) Assignee: Educational Testing Service, Princeton, NJ (US)

( * ) Notice: Subject to any disclaimer, the term of this patent is extended or adjusted under 35 U.S.C. 154(b) by 287 days.

(21) Appl. No.: 17/245,045

(22) Filed: Apr. 30, 2021

Related U.S. Application Data (60) Provisional application No. 63/020,048, filed on May 5, 2020.

(51) Int. Cl.
 G06F 40/35 (2020.01)
 G06F 40/205 (2020.01)
 G10L 25/30 (2013.01)

(52) U.S. Cl.
 CPC ............ *G06F 40/35* (2020.01); *G06F 40/205* (2020.01); *G10L 25/30* (2013.01)

(58) Field of Classification Search
 CPC ......... G10L 25/30; G06F 40/205; G06F 40/30
 See application file for complete search history.

(56) References Cited

U.S. PATENT DOCUMENTS

| 8,301,640 B2* | 10/2012 | Al Badrashiny ........ G09B 7/00 434/156 |
| 10,896,428 B1* | 1/2021 | Balasubramaniam ...................... G10L 15/1815 |
| 11,495,210 B2* | 11/2022 | Li .......................... G10L 15/18 |

OTHER PUBLICATIONS

Wang et al. "Using a stacked residual LSTM model for sentiment intensity prediction", Neurocomputing 322, 2018, pp. 93-101 (Year: 2018).*
Santosa, "Application of the Cross-Entropy Method to Dual Lagrange Support Vector Machine", ADMA 2009, pp. 595-602 (Year: 2009).*

(Continued)

*Primary Examiner* — Pierre Louis Desir
*Assistant Examiner* — Nicole A K Schmieder
(74) *Attorney, Agent, or Firm* — Jones Day (57) ABSTRACT

Human-machine dialog is characterized by receiving data comprising a recording of an individual interacting with a dialog application simulating a conversation. Thereafter, the received data is parsed using automated speech recognition to result in text comprising a plurality of words. Features are extracted from the parsed data and then input an ensemble of different machine learning models each trained to generate a score characterizing a plurality of different dialog constructs. Thereafter, scores generated by the machine learning models for each of the dialog constructs are fused. A performance score is then generated based on the fused scores which characterizes a conversational proficiency of the individual interacting with the dialog application. Data can then be provided which includes or otherwise characterizes the generated score. Related apparatus, systems, techniques and articles are also described.

20 Claims, 6 Drawing Sheets (56) References Cited

OTHER PUBLICATIONS

Bhat, Suma, Yoon, Su-Youn; Automatic Assessment of Syntactic Complexity for Spontaneous Speech Scoring; Speech Communication, 67; pp. 42-57; Mar. 2015.
Burrows, Steven, Gurevych, Iryna, Stein, Benno; The Eras and Trends of Automatic Short Answer Grading; International Journal of Artificial Intelligence in Education, 25(1); pp. 60-117; 2015.
Chakravarty, Saurabh, CHAVA, Raja Venkata Satya Phanindra, FOX, Edward; Dialog Acts Classification for Question-Answer Corpora; Proceedings of the 3rd Workshop on Automated Semantic Analysis of Information in Legal Text; Montreal, Canada; Jun. 2019.
Chen, Yun-Nung, Hakkani-Tur, Dilek, Tur, Gokhan, Gao, Jianfeng, Deng, Li; End-to-End Memory Networks with Knowledge Carry-over for Multi-Turn Spoken Language Understanding; Interspeech; pp. 3245-3249; 2016.
Danescu-Niculescu-Mizil, Cristian, Sudhof, Moritz, Jurafsky, Dan, Leskovec, Jure, Potts, Christopher; A Computational Approach to Politeness with Application to Social Factors; Proceedings of the 51st Annual Meeting of the Association for Computational Linguistics, Sofia, Bulgaria, pp. 250-259, Aug. 2013.
Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.
Evanini, Keelan, Singh, Sandeep, Loukina, Anastassia, Wang, Xinhao, Lee, Chong Min; Content-Based Automated Assessment of Non-Native Spoken Language Proficiency in a Simulated Conversation; Proceedings of the Machine Learning for SLU & Interaction NIPS 2015 Workshop; 2015.
Ghosh, Debanjan, Fabbri, Alexander, Muresan, Smaranda; Sarcasm Analysis Using Conversation Context; Computational Linguistics, 44(4); pp. 755-792; 2018.
Higgins, Derrick; Xi, Xiaoming, Zechner, Klaus, Williamson, David; A Three-Stage Approach to the Automated Scoring of Spontaneous Spoken Responses; Computer Speech and Language, 25(2); pp. 282-306; 2011.
Hochreiter, Sepp, Schmidhuber, Jurgen; Long Short-Term Memory; Neural Computation, 9(8); pp. 1735-1780; 1997.
Litman, Diane, Young, Steve, Gales, Mark, Knill, Kate, Ottewell, Karen, Van Dalen, Rogier, VanDyke, David; Towards Using Conversations with Spoken Dialogue Systems in the Automated Assessment of Non-Native Speakers of English; Proceedings of the 17th Annual Meeting of the Special Interest Group on Discourse and Dialogue; pp. 270-275; 2006.
Liu, Yinhan, Ott, Myle, Goyal, Naman, Du, Jingfei, Joshi, Mandar, Chen, Danqi, Levy, Omer, Lewis, Mike, Zettlemoyer, Luke, Stoyanov, Veselin; RoBERTa: A Robustly Optimized BERT Pretraining Approach; arXiv: 1907.11692; Jul. 2019.
Madnani, Nitin, Loukina, Anastassia, Cahill, Aoife; A Large Scale Quantitative Exploration of Modeling Strategies for Content Scoring; Proceedings of the 12th Workshop on Innovative Use of NLP for Building Educational Applications, Copenhagen, Denmark; pp. 457-467; Sep. 2017.
Mikolov, Tomas, Sutskever, Ilya, Chen, Kai, Corrado, Greg, Dean, Jeffrey; Distributed Representations of Words and Phrases and Their Compositionality; Advances in Neural Information Processing Systems; pp. 3111-3119 2013.
Neumeyer, Leonardo, Franco, Horacio, Digalakis, Vassilios, Weintraub, Mitchel; Automatic Scoring of Pronunciation Quality; Speech Communication; pp. 88-93; 2000.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, VanderPlas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.
Pennington, Jeffrey, Socher, Richard, Manning, Christopher; GloVe: Global Vectors for Word Representation; Proceedings of the Conference on Empirical Methods in Natural Language Processing; pp. 1532-1543; 2014.
Ramanarayanan, Vikram, Lange, Patrick, Evanini, Keelan, Molloy, Hillary, Suendermann-Oeft, David; Human and Automated Scoring of Fluency, Pronunciation and Intonation During Human-Machine Spoken Dialog Interactions; Interspeech; Stockholm, Sweden; pp. 1711-1715; Aug. 2017.
Ramanarayanan, Vikram, Mulholland, Matt, Qian, Yao; Scoring Interactional Aspects of Human-Machine Dialog for Language Learning and Assessment Using Text Features; Proceedings of the SIGDial 2019 Conference, Meeting on Discourse and Dialogue; Stockholm, Sweden; pp. 103-109; Sep. 2019.
Ramanarayanan, Vikram, Suendermann-Oeft, David, Lange, Patrick, Ivanov, Alexei, Evanini, Keelan, Yu, Zhou, Tsuprun, Eugene, Qian, Yao; Bootstrapping Development of a Cloud-Based Spoken Dialog System in the Educational Domain From Scratch Using Crowdsourced Data; Educational Testing Service, Research Report ETS RR-16-16; Jun. 2016.
Sanh, Victor, Debut, Lysandre, Wolf, Thomas; DistilBERT, a Distilled Version of BERT: Smaller, Faster, Cheaper and Lighter; arXiv: 1910.01108; 2019.
Shermis, Mark, Burstein, Jill; Handbook of Automated Essay Evaluation: Current Applications and New Directions; Routledge: New York, NY; 2013.
Skantze, Gabriel; Towards a General, Continuous Model of Turn-Taking in Spoken Dialogue Using LSTM Recurrent Neural Networks; Proceedings of the SIGDIAL 2017 Conference, 18th Annual Meeting on Discourse and Dialogue; Saarbrucken, Germany; pp. 220-230; Aug. 2017.
Sukhbaatar, Sainbayar, Sziam, Arthur, Weston, Jason, Fergus, Rob; End-to-End Memory Networks; Advances in Neural Information Processing Systems; arXiv:1503.08895; pp. 2440-2448; 2015.
Vaswani, Ashish, Shazeer, Noam, Parmar, Niki, Uszkoreit, Jakob, Jones, Llion, Gomez, Aidan, Kaiser, Lukasz, Polosukhin, Illia; Attention Is All You Need; 31st Conference on Neural Information Processing Systems; Long Beach, CA; pp. 5998-6008; 2017.
Weston, Jason, Chopra, Sumit, Bordes, Antoine; Memory Networks; arXiv1410.3916; 2014.
Witt, Silke, Young, Steve; Phone-Level Pronunciation Scoring and Assessment for Interactive Language Learning; Speech Communication, 30(2); pp. 95-108; 2000.
Wolf, Thomas, Debut, Lysandre, Sanh, Victor, Chaumond, Julien, DeLangue, Clement, Moi, Anthony, Cistac, Pierric, Rault, Tim, Louf, Remi, Funtowicz, Morgan, Davison, Joe, Shleifer, Sam, Von Platen, Patrick, Ma, Clara, Jernite, Yacine, Plu, Julien, Xu, Canwen, Le Scao, Teven, Gugger, Sylvain, Drame, Mariama, Lhoest, Wuentin, Rush, Alexander; Huggingface's Transformers: State-of the Art Natural Language Processing; arXiv:1910.03771; 2019.
Xi, Xiaoming, Higgins, Derrick, Zechner, Klaus, Williamson, David; A Comparison of Two Scoring Methods for an Automated Speech Scoring System; Language Testing, 29(3); pp. 371-394; Jul. 2012.
Yang, Zichao, YANG, Diyi, DYER, Chris, HE, Xiaodong, SMOLA, Alex, HOVY, Eduard; Hierarchical Attention Networks for Document Classification; North American Chapter of the Association for Computational Linguistics: Human Language Technologies, pp. 1480-1489; 2016.

* cited by examiner

| Construct | Sub-construct | 1. SVM | 2. SVM++ | 3. LSTM | 4. LSTM_att | 5. MemN2N | 6. BERT | Fusion Results Best system | QWk | Human IRR k | α |
|---|---|---|---|---|---|---|---|---|---|---|---|
| Topic Development | Topic | 0.66 | 0.65 | 0.62 | 0.65 | 0.51 | 0.66 | 1, 2, 3, 4, 5, 6 | 0.69 | 0.70 | 0.73 |
| | Elaboration | 0.69 | 0.68 | 0.63 | 0.67 | 0.62 | 0.68 | 1, 3, 4, 5, 6 | 0.72 | 0.76 | 0.75 |
| | Structure | 0.68 | 0.69 | 0.65 | 0.64 | 0.61 | 0.67 | 1, 5, 6 | 0.72 | 0.75 | 0.75 |
| | Task | 0.71 | 0.72 | 0.66 | 0.69 | 0.62 | 0.71 | 1, 3, 5, 6 | 0.74 | 0.71 | 0.74 |
| Interaction | Engagement | 0.70 | 0.70 | 0.68 | 0.67 | 0.66 | 0.70 | 1, 3, 6 | 0.73 | 0.69 | 0.71 |
| | Turn Taking | 0.67 | 0.68 | 0.63 | 0.63 | 0.62 | 0.70 | 2, 5, 6 | 0.72 | 0.71 | 0.74 |
| | Repair | 0.61 | 0.61 | 0.54 | 0.59 | 0.57 | 0.63 | 1, 3, 5, 6 | 0.69 | 0.73 | 0.71 |
| | Appropriateness | 0.67 | 0.67 | 0.63 | 0.65 | 0.57 | 0.67 | 2, 6 | 0.69 | 0.70 | 0.72 |
| Overall Holistic Performance | | 0.72 | 0.71 | 0.66 | 0.69 | 0.64 | 0.71 | 1, 3, 4, 6 | 0.73 | 0.75 | 0.75 |

FIG. 3

400 can you review my presentation slides before the meeting (a) Topic

Can you review the presentation slides that i made so we can discuss them ...

(b) Task if you would look over the slides for me that would be great yeah that sounds good ...

(c) Appropriateness would be uh wonderful mm do you think sometimes uh before the meeting (d) Overall holistic score.

ENSEMBLE-BASED MACHINE LEARNING CHARACTERIZATION OF HUMAN-MACHINE DIALOG

RELATED APPLICATION

The current application claims priority to U.S. Pat. App. Ser. No. 63/020,048, filed on May 5, 2020, the contents of which are hereby fully incorporated by reference.

TECHNICAL FIELD

The subject matter described herein relates to advanced techniques or characterizing dialog interaction between a human and machine using an ensemble of different types of machine learning models.

BACKGROUND

There is an increasing demand for dialog-based learning and assessment solutions at scale, given the rapidly growing language learning and online education marketplace. Dialog system technologies are one solution capable of addressing and automating this demand at scale. However, such conversational technologies need to be able to provide useful and actionable feedback to users in order for them to be widely adopted.

SUMMARY

In a first aspect, human-machine dialog is characterized by receiving data comprising a recording of an individual interacting with a dialog application simulating a conversation. Thereafter, the received data is parsed using automated speech recognition to result in text comprising a plurality of words. Features are extracted from the parsed data and then input an ensemble of different machine learning models each trained to generate a score characterizing a plurality of different dialog constructs. Thereafter, scores generated by the machine learning models for each of the dialog constructs are fused. A performance score is then generated based on the fused scores which characterizes a conversational proficiency of the individual interacting with the dialog application. Data can then be provided which includes or otherwise characterizes the generated score.

The dialog constructs can take varying forms including, for example, topic development or interaction. Further, the dialog constructs can include sub-constructs which can also take varying forms including, for example, one or more of: topic, elaboration, structure, task, engagement, turn taking, repair, or appropriateness.

The extracted features can related to different aspects including, for example, politeness or acknowledgement.

The machine learning models can take varying forms. For example, one of the machine learning models can comprise a stacked bi-directional long short term memory (BiLSTM) network architecture with context attention in which an output of a first BiLSTM hidden layer is fed as input into a subsequent BiLSTM hidden layer. As a further example, at least one of the machine learning models can include: an End to End Memory Network (MemN2N). As still a further example, at least one of the machine learning models comprises: a transformer-based model. The transformer-based model can take different forms including a Bidirectional Encoder Representations from Transformers (BERT) model.

In some variations, at least one of the machine learning models is a support vector machine (SVM). In this variation, learning performance of the SVM can be optimized using a cross entropy objective function. Further, hyper parameters forming part of the SVM can be fined tuned using a grid search method.

The fusing of the scores can take different forms including, without limitation, through the application of a quadratic weighted kappa to scores generated by the different machine learning models.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for characterizing conversational proficiency based on an interaction between a human and a machine.

The details of one or more variations of the subject matter described herein are set forth in the accompanying drawings and the description below. Other features and advantages of the subject matter described herein will be apparent from the description and drawings, and from the claims.

DETAILED DESCRIPTION

An important step towards enabling language learners to improve their conversational speaking proficiency involves automated scoring of multiple aspects of interactional competence and subsequent targeted feedback. The current subject matters provides enhanced techniques that utilize multiple neural architectures—recurrent, attention and memory based—along with feature-engineered models for the automated scoring of interactional and topic development aspects of text dialog data. Experiments were conducted on a conversational database of text dialogs from human learners interacting with a cloud-based dialog system, which were triple-scored along multiple dimensions of conversational proficiency. It was found that fusion of multiple architectures performs competently on our automated scoring task relative to expert inter-rater agreements, with (i) hand-engineered features passed to a support vector learner and (ii) transformer-based architectures contributing most prominently to the fusion.

The current subject matter provides dialog-based learning and assessment systems which provide useful and actionable feedback to users regarding their conversational proficiency (which in turn can encourage widespread adoption of such systems).

The current subject matter provides technical advantages over conventional techniques as is described comprehensively below along two directions. First, constructs of a text dialog scoring rubric pertaining to topic development were explored along with constructs pertaining to interaction, aiming to understand how various feature-engineering and model-engineering methods perform on a broader range of scoring dimensions. Second, a more comprehensive experimental setup is provided that explores multiple feature-engineered models and deep learning network architectures—recurrent, attention and memory based—for automated scoring.

The current advances were informed by analyzing a corpus of 2288 conversations of nonnative speakers. With this corpus, speakers interact with a dialog application designed to test general English speaking competence in workplace scenarios particularly focusing on pragmatic skills. The application requires participants to interact with their boss and request her for a meeting to review presentation slides using pragmatically appropriate language).

Each of the 2288 dialog responses were triple scored by human expert raters on a custom-designed rubric. The rubric defined 12 sub-constructs under the three broad constructs of linguistic control, topic development and interaction, apart from an overall holistic score. This study investigates the topic development construct for the first time in addition to interaction. See Table 1 for specific details of the constructs examined.

| Construct | Sub-construct | Description |
|---|---|---|
| Topic Development | Topic | Examines to what extent the responses are uniformly on topic and relevant. |
| | Elaboration | Examines the extent to which arguments are developed taking into account dialog history and with minimal or no repetition. |
| | Structure | Evaluates the structure of the discourse and chain of reasoning, along with the appropriate use of discourse markers. |
| | Task | Evaluates how well the user accomplished the task over the course of the interaction. |
| Interaction | Engagement | Examines the extent to which the user engages with the dialog agent and responds in a thoughtful manner. |
| | Turn Taking | Examines the extent to which the user takes the floor at appropriate points in the conversation without noticeable interruptions or gaps. |
| | Repair | Examines the extent to which the user successfully initiates and completes a repair in case of a misunderstanding or error by the dialog agent. |
| | Appropriateness | Examines the extent to which the user reacts to the dialog agent in a pragmatically appropriate manner. |
| Overall Holistic Performance | | Measures the overall performance. |

Table 1: Human scoring rubric for interaction aspects of conversational proficiency. Scores were assigned on a Likert scale from 1-4 ranging from low to high proficiency. A score of 0 was assigned when there were issues with audio quality or system malfunction or off-topic or empty responses.

Automated Scoring Methods. First described is a hand-engineered feature set used in conjunction with a linear support vector machine (SVM) classifier. Next, recurrent, memory and attention based architectures are described. The automated scoring models provided herein were trained to predict valid dialog-level scores from 1-4 (only dialogs with a non-zero score were considered as part of the scoring model training). An exception to this is in the case of the memory network, where scores are predicted at the turn-level, and the dialog level score is reported as the median score across all turns of that dialog. The mean performance of scoring systems was reported on a 10-fold cross-validation (CV) experimental setup. In addition, accuracy and quadratic weighted kappa (which takes into account the ordered nature of the categorical labels) are reported herein as metrics.

Feature Engineering Approaches. Two sets of exemplary features were examined. First, features that explicitly capture content (e.g., word n-grams, character n-grams) and grammatical structures (e.g., dependency trees). These features are summarized in Table 2. These features were found to be effective in predicting sub-constructs such as engagement and turn taking in earlier work. Second, nuanced features are utilized that are related to the power dynamics of social interactions and are often indicators of whether an interaction went well or not. It is hypothesized that features that capture interaction strategies such as gratitude expression or greetings will be particularly useful, given that the corpus involves conversations between a participant and their boss. Special focus is provided below on features that capture politeness and acknowledgment. The current features capture strategies such as counterfactual modals ("could/would you . . . "), the indicative modal ("can/will you . . . "), deferential back-shift ("I was wondering . . . "), gratitude ("Thank you . . . "), apologies ("I apologize", "forgive me"), appreciation, especially at the end of the conversation ("sounds good", "works great"), requests ("please review . . . "), greetings ("Hi, hello miss"), mainly in the beginning of the conversation to build a positive relationship, and hedging ("I suggest . . . "). These features can be binary, indicating, whether a dialog consists of a specific politeness strategy. Table 3 presents exemplars of politeness strategies observed in our training corpus.

| Feature | Description |
|---|---|
| Word n-grams | Word n-grams are collected for n = 1 to 2. This feature captures patterns about vocabulary usage (key words) in responses. |
| Character n-grams | Character n-grams (including whitespace) are collected for n = 2 to 5. This feature captures patterns that abstract away from grammatical and other language use errors. |
| Response length | Defined as $\log_2(\text{chars})$, where chars represents the total number of characters in a response. |
| Syntactic dependencies | A feature that captures grammatical relationships between individual words in a sentence. This feature captures linguistic information about "who did what to whom" and abstracts away from a simple unordered set of key words. |
| Discourse strategy | Features based on presence or absence of specific words in the response that represent different discourse strategies (see Table 3 for examples of politeness strategies). |

Table 2: Content and grammatical structure features used for machine scoring.

SKLL, an open-source Python package that wraps around the scikit-learn package, was used to perform machine learning experiments. Reported is the mean performance of linear support vector machines (SVM) in which a cross entropy (log-loss) objective function was used to optimize learner performance, and hyperparameters such as the regularization coefficient were fine-tuned using a grid search method.

| Strategy | Example |
|---|---|
| Counterfactual | Could you also review my slides? |
| Indicative | . . . if we can meet . . . |
| Deferential | I was wondering do you have time |
| Gratitude | I greatly appreciate your time. |
| Apology | Sorry to bother you . . . |
| Appreciation | Sounds good. I will see you . . . |
| Request | Please review the presentation . . . |
| Greetings | Hi Hello Miss Lisa it is good . . . |
| Hedges | . . . and suggest me anything . . . |

Table 3: Politeness strategy exemplars reproduced from the training corpus.

Figure 1:
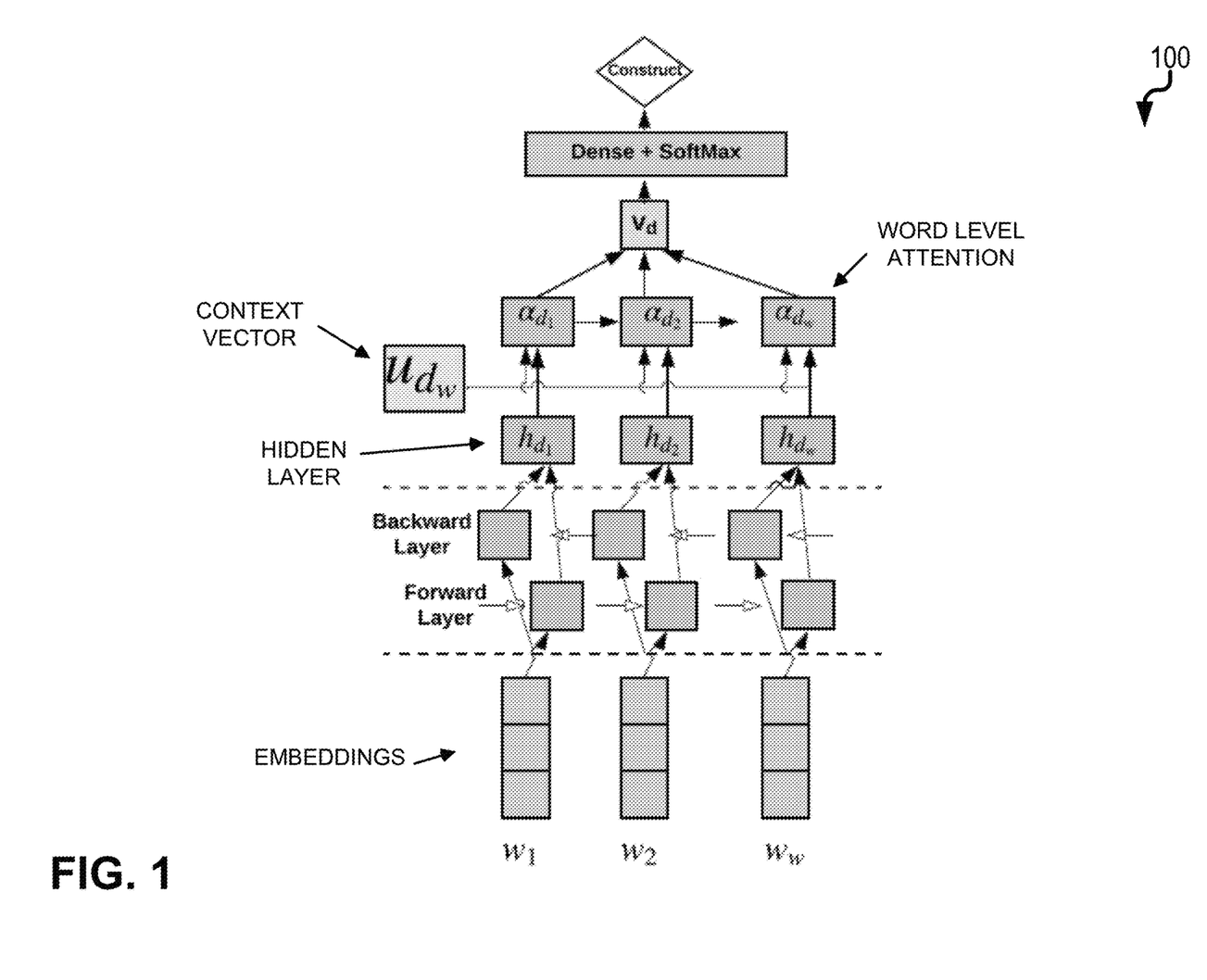
FIG. 1 is a system diagram illustrating a word-level bi-directional long short term memory network in combination with an attention network for dialog characterization.

Recurrent Architectures with and without Attention. Recurrent architectures, such as Long Short-Term Memory (LSTM) networks including bi-directional LSTM (BiLSTM) networks, are able to learn long-term dependencies and are effective in many NLP tasks related to dialog and turn-taking scenarios. As an example and with reference to diagram 100 of FIG. 1, a stacked BiLSTM network architecture can be implemented with context attention. Here the output of the first BiLSTM hidden layer can be fed as input into the subsequent BiLSTM hidden layer. Varying depths of the stack can be utilized, and in some cases, depth=2. The attention mechanism utilized can be as follows. Let the number of words in the dialog d be w and the hidden representation for word $w_{di}$ be $h_{di}$. A word-level attention mechanism can be provided where the word representation itch is weighted by measuring similarity with a word level context vector $u_{dw}$, i.e., randomly initialized and jointly learned during the training. Finally, a dialog vector $u_d$ can be computed that summarizes the weighted sum of the word annotations based on the weights.

$$u_{d_i} = \tanh(W_d h_{d_i} + b_w) \quad (1)$$

$$v_d = \sum_{i \in [1,w]} \alpha_{d_i} h_{d_i} \quad (2)$$

where attention $\alpha_{di}$ is calculated as:

$$\alpha_{d_i} = \frac{\exp(u_{d_i}^T u_{d_w})}{\sum_{i \in [1,w]} \exp(u_{d_i}^T u_{d_w})} \quad (3)$$

Referring again to diagram 100 of FIG. 1, a high-level structure of the BiLSTM Attention architecture is provided. Words are represented as embeddings and fed to the BiLSTM network. For illustration purposes, only one BiLSTM layer composed of the forward and backward layer which account to the hidden layer $h_{di}$ is illustrated. Next, context vector $u_{dw}$ is utilized to generate word level attention $\alpha_{di}$. Finally, the dialog vector $u_d$ passes through a dense+Softmax layer to predict the score of the construct in the given experiment.

To tune the hyperparameters for BiLSTM based experiments, the training data for each CV fold was split into 80% train and 20% dev, and use the dev partition for parameter tuning. The following hyperparameters for the BiLSTM architectures can be used: GloVe embeddings (100D), mini-batch size of 16, recurrent dropout value of 0.3, 10 epochs (with an early-stopping patience of 5), and the Adam optimizer with its default parameters.

Figure 2:
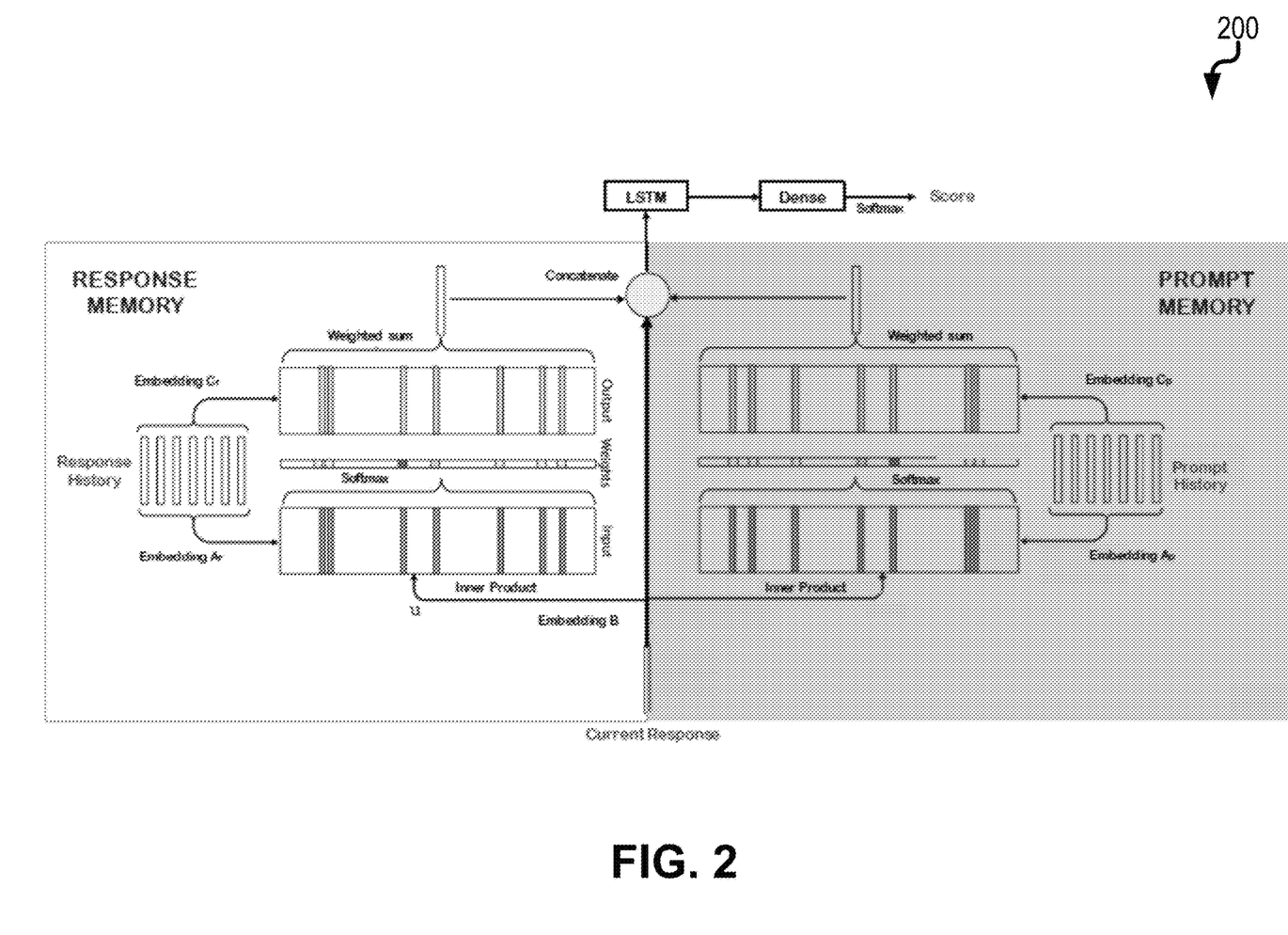
FIG. 2 is a diagram illustrating a single hop module of a modified end-to-end memory network (MemN2N) in which stacking modules on top of each other allows for multiple hops.

End to End Memory Networks (MemN2Ns). Also provided herein is the End to End Memory Network (MemN2N) architecture which is adapted to the dialog scoring task. With reference to diagram 200 of FIG. 2, the end to end MemN2N architecture models dependencies in text sequences using a recurrent attention model coupled with a memory component, and is therefore suited to modeling how response and prompt histories contribute to a dialog score. The original MemN2N architecture can be modified in the following ways: (i) instead of the original (query, fact history, answer) tuple that is used to train the network, there can be a (current response, response history, prompt history, answer) tuple. In other words, not only memory representations between the current response and the history of previous responses are embedded and learned, but the history of prior system prompts that have been encountered thus far; (ii) an LSTM can be used instead of a matrix multiplication at the final step of the network before prediction; (iii) the network can be trained at the turn level such that the dialog-level score can be assigned as the median score of all scores predicted by the network at the turn-level.

Hyperparameters of the network can be tuned in a variety of manners including using the hyperas toolkit. This tuning can include the number of neurons in the Dense and LSTM layers as well as the addition of Dropout layers after each memory component. The example network was trained for 40 epochs (but with an early-stopping patience of 5). 1, 2 and 3 memory hops were experimented with and it was found that 2 was optimal. It was found that initializing the memory embedding matrices with pretrained word2vec or GloVe embeddings worked better than randomly-initialized ones for prompt history encoding in particular.

Transformer Models. Another class of explored models comprise the purely attention-based family of transformer models. Attention is a mechanism in the neural network that a model can learn to make predictions by selectively attending to a given set of data (and if predictions are being made for one part of a data sample using other parts of the observation about the same sample, this is self-attention). The amount of attention is quantified by learned weights and thus the output is usually formed as a weighted average. The transformer family of models allows one to model sequence data without using recurrent network units by leveraging a special scaled dot product attention mechanism in an encoder-decoder framework, and thus can be particularly suited to modeling dialog time series data.

Various types of transformer models can be used including BERT (Bidirectional Encoder Representations from Transformers) pre-trained transformer-based language models, RoBERTa, DistilBERT, and the like. The Hugging-Face transformers library was used to fine-tune a pre-trained model (bert-base-uncased) on training data for each fold of our 10-fold cross-validation setup and report performance averaged across all folds. The following hyperparameters were used: number of epochs=5, learning rate=5e-5, and Adam epsilon=1e-8.

Observations and Results

Figure 3:
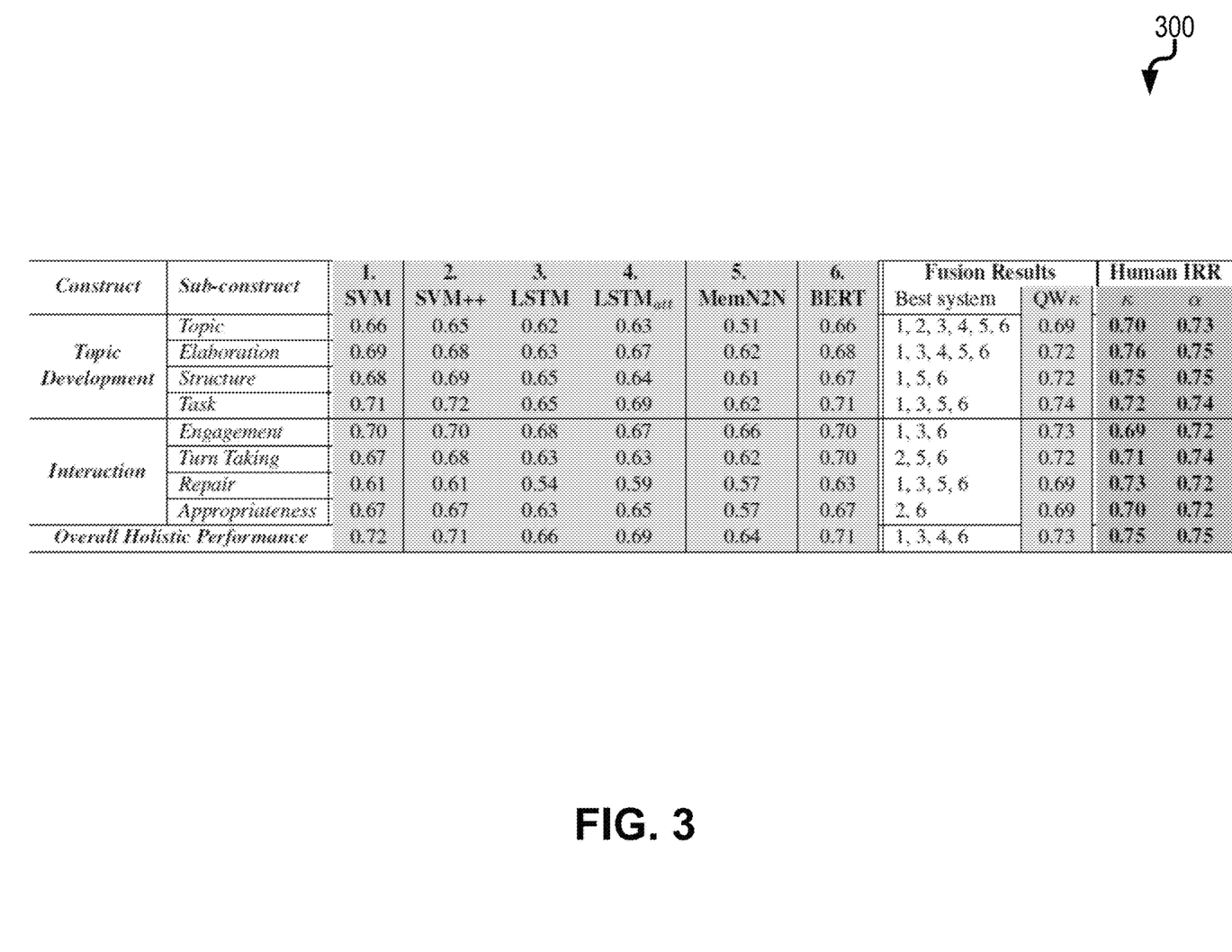
FIG. 3 is a table illustrating automated scoring performance across different systems using different machine learning model types.

FIG. 3 is a diagram 300 including a table that shows quadratic weighted kappa (QWκ) values produced by the different automated scoring methods explored in this study. In particular, FIG. 3 shows automated scoring performance (as measured by the quadratic weighted kappa or QWκ) of the 6 systems explored above. Reported are results for the fusion system with the best QWκ (optimized across all combinations of individual systems). The last two columns present Human Inter Rater Agreements for the same data expressed in Krippendorff α and Conger κ (note that this is not directly comparable to the reported QWκs).

Referring still to FIG. 3, notice that all systems generally produce accuracy numbers in the 0.6-0.7 range, with the BERT and SVM systems (with hand-engineered content features) performing best individually. The final two columns of the table in FIG. 3 display two inter-rater agreement statistics—Conger κ and Krippendorff α—for the human expert scores assigned to the data. Recall that each dialog was scored by 3 out of 8 possible raters. A moderate to high agreement was observed between raters for all dimensions of the scoring rubric.

Additionally, it is interesting to note that the QWκ of the fusion system is in a similar ballpark as the κ and α metrics for human inter-rater agreement across all constructs examined, even slightly higher in some cases such as the task, engagement, and turn-taking constructs. Note however that the QWκ values are not directly comparable to the Conger κ values, and the human inter-rater agreement values are more of a reference point than a benchmark value.

It was observed that the best fusion systems across constructs all involve the SVM (either with or without politeness features) and BERT systems, suggesting that a combination of feature engineering of content and grammar features along with a neural model leveraging principled attention mechanisms perform best at this automated scoring task. Additionally, it is shown that MemN2N memory networks make a useful contribution in predicting the constructs of turn taking, repair, and topic development, all constructs that require one to take prior conversational history of the dialog into explicit account in a principled manner. LSTM models (either without or with attention) were part of the best fusion systems for topic, elaboration, engagement and overall holistic performance, which require evaluation at the level of the entire dialog.

In addition to the performance of an SVM system, an SVM++system was utilized that includes features capturing politeness in the discourse. Also note that SVM experiments and SVM++ are denoted as systems 1 and 2 respectively for clarity and brevity. It was observed that lexicon features capturing politeness help the SVM++ system achieve better accuracy, particularly for the structure, turntaking, and appropriateness constructs, which is in line with expectations, given that our dialog task requires speakers to use appropriate strategies such as greeting, gratitude, and appreciation, among others, in order to accomplish the task successfully.

The BiLSTMs with attention (marked as $LSTM_{attn}$ in the table in FIG. 4 or system number 4) perform better compared to the vanilla BiLSTM networks (system number 3) for all the constructs. An attention layer was positioned on top of the stack networks, which means the attention mechanism is able to identify the key characteristics of the constructs. The heat maps of the attention weights were analyzed to obtain a better understanding of the model performance.

Figure 4:
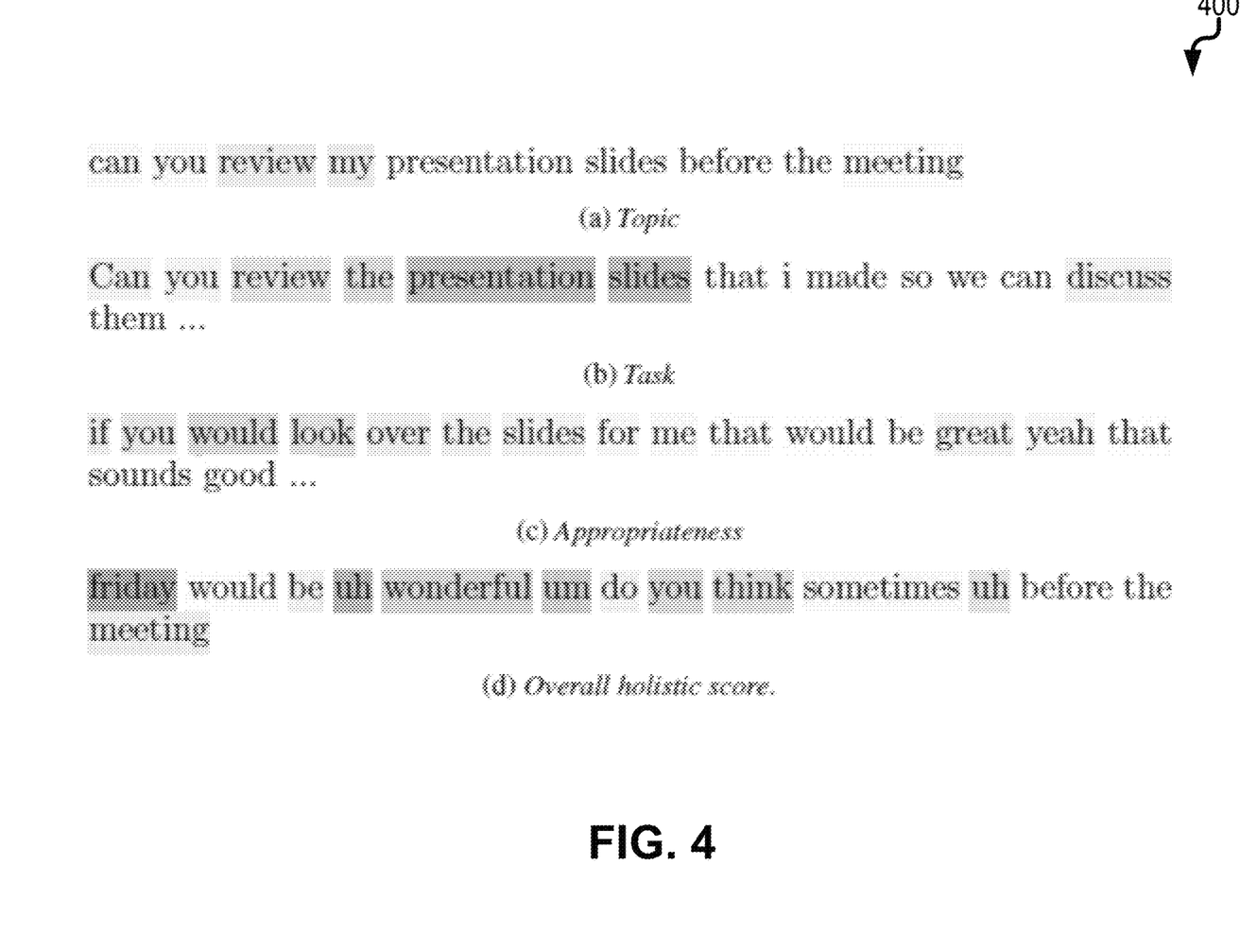
FIG. 4 is a diagram illustrating attention weights for different scoring constructs obtained from a transformer with attention model.

Each example depicted in diagram 400 of FIG. 4, depicts heat map of the words from a portion of the dialog data corresponding to a request. Dialogs were chosen which obtained a median human score of 4 (i.e., high proficiency) and were correctly classified by the BiLSTMs with attention model. It was observed that words such as "meeting" and "discussion" receive high weights for the topic construct (FIG. 4(a)). Likewise, FIG. 4(b) also shows that the words representing actions, such as "reviewing slides" or "discussion" received the highest weights for the task construct. For appropriateness, it was observed that words representing positive and respectful tone (e.g., "if you would look"; "great yeah") received higher attention weights (FIG. 4(c)). Finally, in the FIG. 4(d) the heat map for overall holistic performance was observed. Besides key terms such as "Friday" (part of the task as well as the automated agent's responses), it was observed that positive sentiment words such as "wonderful" receive higher attention weights, suggesting that maintaining a positive intonation is weighted more by the BiLSTM with attention model.

Finally, the results from BERT are reported as System 6 in the table in FIG. 3. It was observed, that BERT consistently performs best or comparable to the best model(s) across all the constructs. This verifies the superiority of the transformer architecture in this regard.

Conversational proficiency can be characterized by using an ensemble of models (e.g., two or more models in FIG. 3, etc.) which can be used to score various dialog constructs. The outputs of these models can be combined or otherwise consumed by other processes/models to characterize conversational proficiency.

Figure 5:
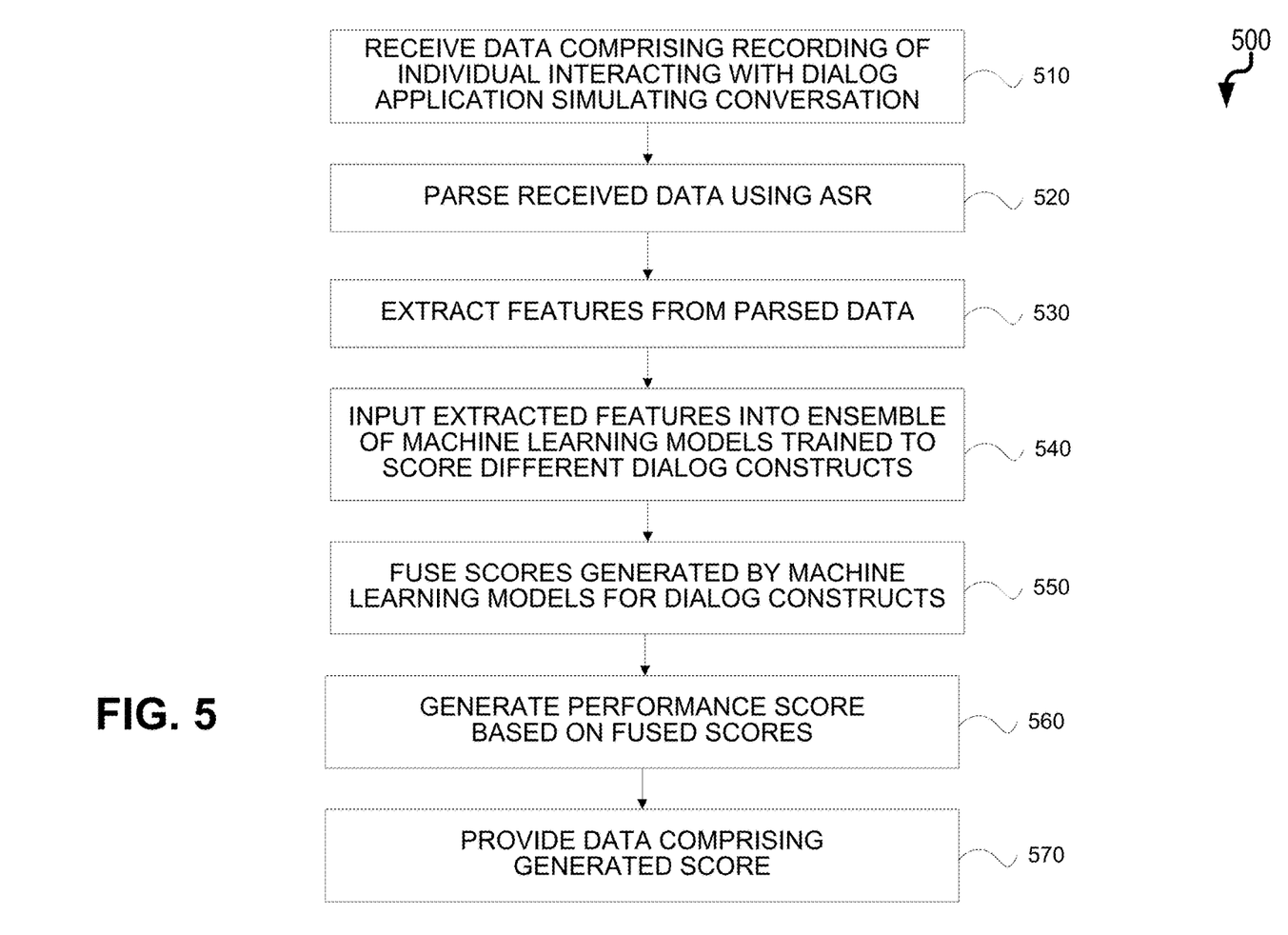
FIG. 5 is a process flow diagram illustrating ensemble-based machine learning characterization of human-machine dialog.

FIG. 5 is process flow diagram 500 illustrating the characterization of a human-document, machine dialog in which, at 510, data is received that comprises a recording of an individual interacting with a dialog application (i.e., a computer application) simulating a conversation. Thereafter, at 520, the received data is parsed using automated speech recognition to result in text comprising a plurality of words. Features are then extracted, at 530, from the parsed data. The extracted features are then inputted, at 540, into an ensemble of different machine learning models each trained to generate a score characterizing a plurality of different dialog constructs. Scores generated by the machine learning models are then fused, at 550, for each of the dialog constructs. A performance score can then be generated, at 560, that characterizing a conversational proficiency of the individual interacting with the dialog application. Data can then be provided (e.g., displayed in an application in a GUI, loaded into memory, stored in physical persistence, transmitted to a remote computing system, etc.), at 570, which includes the generated score.

Figure 6:
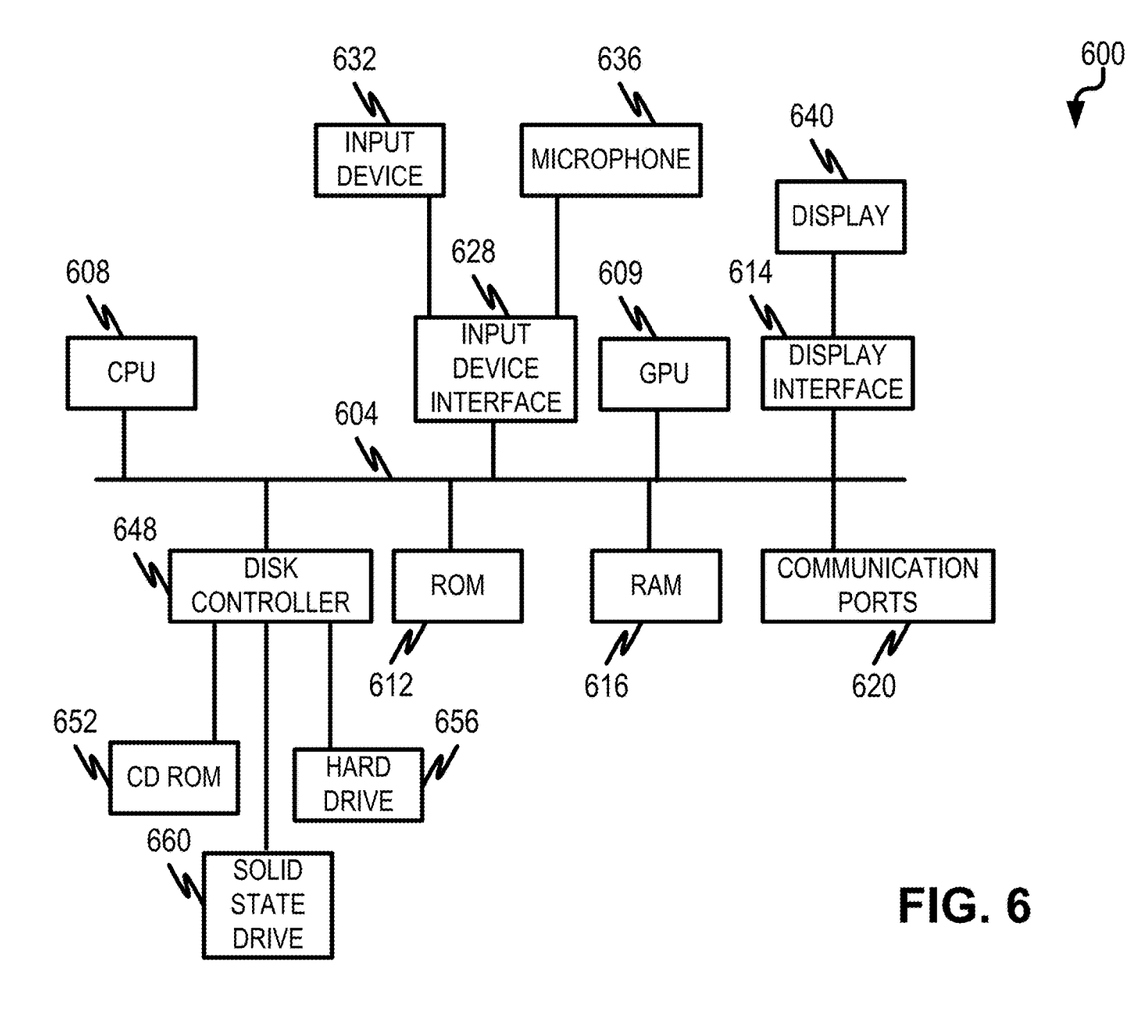
FIG. 6 is a diagram illustrating aspects of a computing device for implementing the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) or labeled GPU (graphical processing unit) 609 (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for characterizing human-machine dialog comprising:
   receiving data comprising a recording of an individual interacting with a dialog application simulating a conversation;
   parsing the received data using automated speech recognition to result in text comprising a plurality of words;
   extracting features from the parsed data;
   inputting the extracted features into an ensemble of different machine learning models each trained to generate a score corresponding to each of a plurality of different dialog constructs, a first of the ensemble of different machine learning models being a stacked bi-directional long short term memory (BiLSTM) network, a second of the ensemble of different machine learning models being an End to End Memory Network (MemN2N), a third of the ensemble of different machine learning models being a transformer network;
   fusing, for each of the dialog constructs, scores generated by the different machine learning models;
   generating, based on the fused scores, a performance score characterizing a conversational proficiency of the individual interacting with the dialog application; and
   providing data comprising the generated score.

2. The method of claim 1, wherein the plurality of dialog constructs comprise topic development or interaction.

3. The method of claim 1, wherein the plurality of dialog constructs comprise sub-constructs comprising one or more of: topic, elaboration, structure, task, engagement, turn taking, repair, or appropriateness.

4. The method of claim 1, wherein at least a portion of the extracted features characterize politeness or acknowledgement.

5. The method of claim 1, wherein the BiLSTM has context attention in which an output of a first BiLSTM hidden layer is fed as input into a subsequent BiLSTM hidden layer.

6. The method of claim 1, wherein memory representations embedded and learned by the MemN2N are based on a current response, a response history, a prompt history, and an answer.

7. The method of claim 1, wherein the transformer network comprises: a Bidirectional Encoder Representations from Transformers (BERT) model.

8. The method of claim 1, wherein at least one of the machine learning models is a support vector machine.

9. The method of claim 8 further comprising:
   optimizing learner performance of the support vector machine using a cross entropy objective function.

10. The method of claim 9 further comprising:
    fine tuning hyper parameters forming part of the support vector machine using a grid search method.

11. The method of claim 1, wherein the fusing comprises: applying a quadratic weighted kappa to scores generated by the different machine learning models to generate the fused scores for the different dialog constructs.

12. A system for characterizing human-machine dialog comprising:
    at least one data processor;
    memory for storing instructions which, when executed by the at least one data processor, result in operations comprising:
        receiving data comprising a recording of an individual interacting with a dialog application simulating a conversation;
        parsing the received data using automated speech recognition to result in text comprising a plurality of words;
        extracting features from the parsed data;
        inputting the extracted features into an ensemble of different machine learning models each trained to generate scores corresponding to each of a plurality of different dialog constructs, a first of the ensemble of different machine learning models being a stacked bi-directional long short term memory (BiLSTM) network, a second of the ensemble of different machine learning models being an End to End Memory Network (MemN2N), a third of the ensemble of different machine learning models being a transformer network;
        fusing, for each of the dialog constructs, scores generated by the different machine learning models;
        generating, based on the fused scores, a performance score characterizing a conversational proficiency of the individual interacting with the dialog application; and
        providing data comprising the generated score.

13. The system of claim 12, wherein the plurality of dialog constructs comprise topic development or interaction.

14. The system of claim 12, wherein the plurality of dialog constructs comprise sub-constructs comprising one or more of: topic, elaboration, structure, task, engagement, turn taking, repair, or appropriateness.

15. The system of claim 12, wherein at least a portion of the extracted features characterize politeness or acknowledgement.

16. The system of claim 12, wherein the BiLSTM has context attention in which an output of a first BiLSTM hidden layer is fed as input into a subsequent BiLSTM hidden layer.

17. The system of claim 12, wherein the transformer network comprises a Bidirectional Encoder Representations from Transformers (BERT) model.

18. The method of claim 12, wherein at least one of the machine learning models comprises a a support vector machine.

19. A computer-implemented method for characterizing human-machine dialog comprising:
    receiving data comprising a recording of an individual interacting with a dialog application simulating a conversation;
    parsing the received data using automated speech recognition to result in text comprising a plurality of words;
    extracting features from the parsed data;
    inputting the extracted features into an ensemble of different machine learning models each trained to generate a score corresponding to each of a plurality of different dialog constructs relating to topic development and/or interaction;

fusing, for each of the dialog constructs, scores generated by the different machine learning models;

generating, based on the fused scores, a performance score characterizing a conversational proficiency of the individual interacting with the dialog application; and providing data comprising the generated score;

wherein the ensemble of different machine learning models comprises each of:
- a stacked bi-directional long short term memory (BiLSTM) network architecture,
- an End to End Memory Network (MemN2N), and
- a transformer-based model.

20. The method of claim 19, wherein the ensemble of different machine learning models further comprises a support vector machine.

* * * * *